United States Patent [19]

Takamiya et al.

[11] Patent Number: 5,030,183
[45] Date of Patent: Jul. 9, 1991

[54] FRICTION STEPLESS SPEED CHANGE DEVICE

[75] Inventors: Kikuzo Takamiya, Kitamoto; Yoshitaka Tamura, Saitama; Kiyofumi Hirai, Ageo, all of Japan

[73] Assignee: Bridgestone Cycle Co., Ltd., Tokyo, Japan

[21] Appl. No.: 535,066

[22] Filed: Jun. 8, 1990

[30] Foreign Application Priority Data

Jun. 9, 1989 [JP] Japan ................ 1-145270

[51] Int. Cl.$^5$ .......................................... F16H 37/06
[52] U.S. Cl. .................................................. 475/215
[58] Field of Search .......................... 475/214, 215, 217

[56] References Cited

U.S. PATENT DOCUMENTS

| 2,233,967 | 3/1941 | Wellton | 475/215 X |
| 2,583,496 | 1/1952 | Rongelot | 475/215 X |
| 3,238,816 | 3/1966 | Schottler | 475/215 X |

FOREIGN PATENT DOCUMENTS

| 0481565 | 3/1952 | Canada | 475/215 |
| 16-5765 | 3/1941 | Japan . | |
| 46-34919 | 12/1971 | Japan . | |
| 46-42249 | 12/1971 | Japan . | |
| 49-29168 | 8/1974 | Japan . | |

*Primary Examiner*—Dirk Wright
*Attorney, Agent, or Firm*—Parkhurst, Wendel & Rossi

[57] ABSTRACT

A friction stepless speed change device includes an input shaft, an output shaft, a countershaft provided in parallel with the input and output shafts on one side thereof, two rocking arms rockable about the countershaft, a cylindrical driven rotary assembly rotatably supported on free ends of the rocking arms to enclose the input shaft, a set of driving friction discs rotating together with the input shaft, and a set of driven friction discs rotating together with the driven rotary assembly. The sets of the driving and driven friction discs are wedge-engaged with each other. A gear fixed to the driven rotary assembly is in mesh with one gear of an intermediate gear assembly, and a gear arranged on a planet carrier is in mesh with the other gear of the intermediate gear assembly. Planet gears journaled on the planet carrier are in mesh with an internal gear integrally fixed to the input shaft, and a sun gear integrally formed on the output shaft is in mesh with the planat gears.

1 Claim, 6 Drawing Sheets

FIG_1

FIG_2

FIG_6

FIG. 7

FRICTION STEPLESS SPEED CHANGE DEVICE

BACKGROUND OF THE INVENTION

This invention relates to a friction stepless speed change device for general purpose being suitable for use in industrial machines, automobiles, other vehicles and the like.

The friction stepless speed change devices concerning with the invention are classified into cone, disc, ring and spherical surface transmissions.

With any of the friction stepless speed change devices above described, the stepless speed change transmission is effected by changing rotating radii of friction transmission contact points in a stepless manner. The friction transmission contact points are divided into two kinds of external and internal contact types.

The external contact types are disclosed, for example, in Japanese Utility Model Application Publication No. 49-29,168 and Japanese Patent Application Publication No. 46-42,249. On the other hand, the internal contact types are disclosed, for example, in Japanese Utility Model Application Publication No. 46-34,919 and Japanese Patent Application Publication No. 41-5,765.

In the external contact type, the transmission is accomplished by contact between two convex surfaces, whose contact surfaces are wide, belt-like surfaces along contact orbits corresponding to pitch lines due to contact pressures.

As a result, positive and negative slips occur on outer and inner sides of the contact orbit so that such slips result in internal friction losses which lower the transmission efficiency.

Moreover, the case of which either the driving or driven side has a small curvature rotor, when the difference in rotating radii of the driving and driven sides becomes large, the above positive and negative slips further rapidly increase. As a result, the transmission efficiency is further lowered.

Therefore, the friction stepless speed change device of the external contact type has a disadvantage in that the transmission efficiency is low due to the external contact.

On the other hand, with the device of the internal contact type, the transmission is effected by contact between a concave surface and a convex surface. Contact orbits are narrow line-shaped surfaces.

Consequently, the device of the internal contact type is superior, having less internal friction losses and high transmission efficiency, to the device of the external contact type.

With the device of the internal contact type, however, any of an input and an output shaft surround the other shaft and one shaft for supporting friction transmission members must be movable.

Accordingly, owing to the construction, it is difficult to support the shaft performing translational movements rigidly.

With the device of the internal contact type, moreover, the friction discs are in point contact only at one point and high contact pressure therebetween is required, with the result that the friction discs are apt to open out of a parallel position.

In other words, even with the internal contact type, it is difficult to maintain the friction discs in parallel with each other so that contact pressure becomes unstable. As a result, transmission of torque is obstructed and hence transmission efficiency lowers. This disadvantage is acute in multiple-friction disc construction.

SUMMARY OF THE INVENTION

It is an object of the invention to provide a friction stepless speed change device which eliminates all the disadvantages of the prior art above described and which accomplishes high transmission efficiency.

In order to accomplish this object, according to the invention the friction stepless speed change device comprises an input shaft and an output shaft rotatably arranged on a common axis, a countershaft provided in parallel with the input and output shafts on one side thereof, two rocking arms rockable about the countershaft, a cylindrical driven rotary assembly rotatably supported on free ends of the rocking arms and arranged to enclose the input shaft, a set of driving friction discs rotating together with the input shaft, a set of driven friction discs rotating together with the driven rotary assembly, said driving and driven friction discs being wedge-engaged with each other, an intermediate gear assembly having an input side gear and an output side gear integrally connected to each other, a gear fixed to the driven rotary assembly and being in mesh with the input side gear of the intermediate gear assembly, a gear arranged on a planet carrier rotatably provided on an extension of the common axis and being in mesh with the output side gear of the intermediate gear assembly, an internal gear integrally fixed to the input shaft, planet gears journaled on the planet carrier and being in mesh with the internal gear, and a sun gear integrally formed on the output shaft and being in mesh with the planet gears.

In another aspect of the invention, in a friction stepless speed change device including a set of driving friction discs and a set of driven friction discs arranged outwardly of the set of driving friction discs, these friction discs being wedge-engaged in an internal contact relation and causing axes of the sets of the friction discs to be eccentric relative to each other to change rotating ratios between input and output shafts in a stepwise manner, the device comprises a cylindrical driven rotary assembly in which the set of driven friction discs and a urging friction disc are axially movably splined-fitted, a slide cylindrical member axially movably arranged about the cylindrical driven rotary assembly, a connecting member connecting the urging friction disc and the slide cylindrical member, and spring means for urging the urging friction disc against the other friction discs.

As above described, according to the invention, the set of driving friction discs rotating together with the input shaft and the set of driven friction discs adjustable in eccentricity relative to the input shaft are wedge-engaged with each other in an internal contact relation.

The friction discs are tapered radially outwardly so that the driving and driven friction discs are engaged with each other with their tapered surfaces as if they were wedges. Such an engagement is referred to herein as "wedge-engagement" or "wedge-engaged".

At a top speed or in a top speed changed condition, the driving and driven friction discs are engaged with each other in a concentric condition. Therefore, under the top condition both the friction discs are engaged under pressure along whole their circumferences so that very high transmission efficiency such as approximately 100% can be accomplished.

Moreover, under speed changed conditions other than the top speed, the driven friction discs are eccentric relative to the driving friction discs so that both the friction discs are partially engaged. The contact in this case is an internal contact and difference in diameters of pitch lines at the friction transmission contact of both the friction discs is not very large. Consequently, the friction transmission contact lines extend as thin lines on the pitch lines so that the positive and negative slip zones positioned on both sides of the pitch lines are narrower than those in the prior art.

Therefore, even under speed changed zones other than the top speed a fairly high transmission efficiency can be accomplished Namely, the friction stepless speed change device according to the invention exhibits in all speed changed zones very high transmission efficiency which could not be expected in the prior art.

Moreover, according to the invention the countershaft is provided in addition to the input shaft, and the eccentricity is adjusted by the arm rockable about the countershaft. Therefore, the driven rotary assembly is supported at both ends so that axes of the input and output shafts and axis of the driven rotary assembly are easily maintained in parallel with each other.

Furthermore, the driven friction discs are constantly subjected to forces to open the discs out of the parallel position. However, as the urging friction disc for urging the driven friction discs is firmly fixed to the slide cylindrical member free from inclination by means of the connecting pins, the urging friction disc is prevented from inclining so that the driven friction discs are maintained in parallel positions as a whole.

Consequently, the friction stepless speed change device according to the invention exhibits the high transmission efficiency, while the friction discs are easily maintained in parallel positions even if a number of friction discs are used in multilayers in order to transmit large torque.

The invention will be more fully understood by referring to the following detailed specification and claims taken in connection with the appended drawings.

DETAILED EXPLANATION OF THE PREFERRED EMBODIMENTS

Referring to FIGS. 1-7, one preferred embodiment of the device according to the invention will be explained.

The device comprises a hollow cylindrical main casing 1 having an input side casing 2 fixed by bolts 3 to an input side end surface of the casing 1, and an output side casing 4 fixed by bolts 5 (FIG. 2) to an output side end surface of the casing 1 together with an intermediate support 6.

The input side casing 2 is formed a hollow boss 2a extending into a center of the main casing 1 and having at its inner end an enlarged diameter portion or bearing portion 2b.

The intermediate support 6 is formed with a hollow boss 6a extending into a center of the main casing 1 and having at both ends enlarged diameter portions or bearing portions 6b.

An input shaft 7 is rotatably supported in a ball bearing 8 provided in the bearing portion 2b of the input side casing 2, a ball bearing 9 provided in the bearing portion 6b of the intermediate support 6, and a ball bearing 10 provided at a bottom of the hollow boss 6a. Reference numeral 11 denotes an oil seal.

The output side casing 4 is formed at its center with hollow bosses 4a and 4b extending into the outside and inside of the main casing 1. An output shaft 14 concentric to the input shaft 7 is rotatably supported in two ball bearings 12 and 13 provided in the bosses 4a and 4b. The output shaft 14 is integrally formed at an inner end with a sun gear 15. Reference numeral 16 illustrates an oil seal.

The main casing 1 is provided at upper ends with bearing portions 1a and 1b, while the output side casing 4 is provided at an upper portion with a bearing portion 4d. A countershaft 17 in parallel with the input shaft 7 is provided in these bearings 1a, 1b and 4d. Rocking arms 18 and 19 are rockably journaled with their bottoms in bearings 18a and 19a by the countershaft 17 on both sides in the main casing 1.

The rocking arms 18 and 19 are connected to each other at their free ends through a connecting plate 20 by means of bolts 21.

Figure 6:
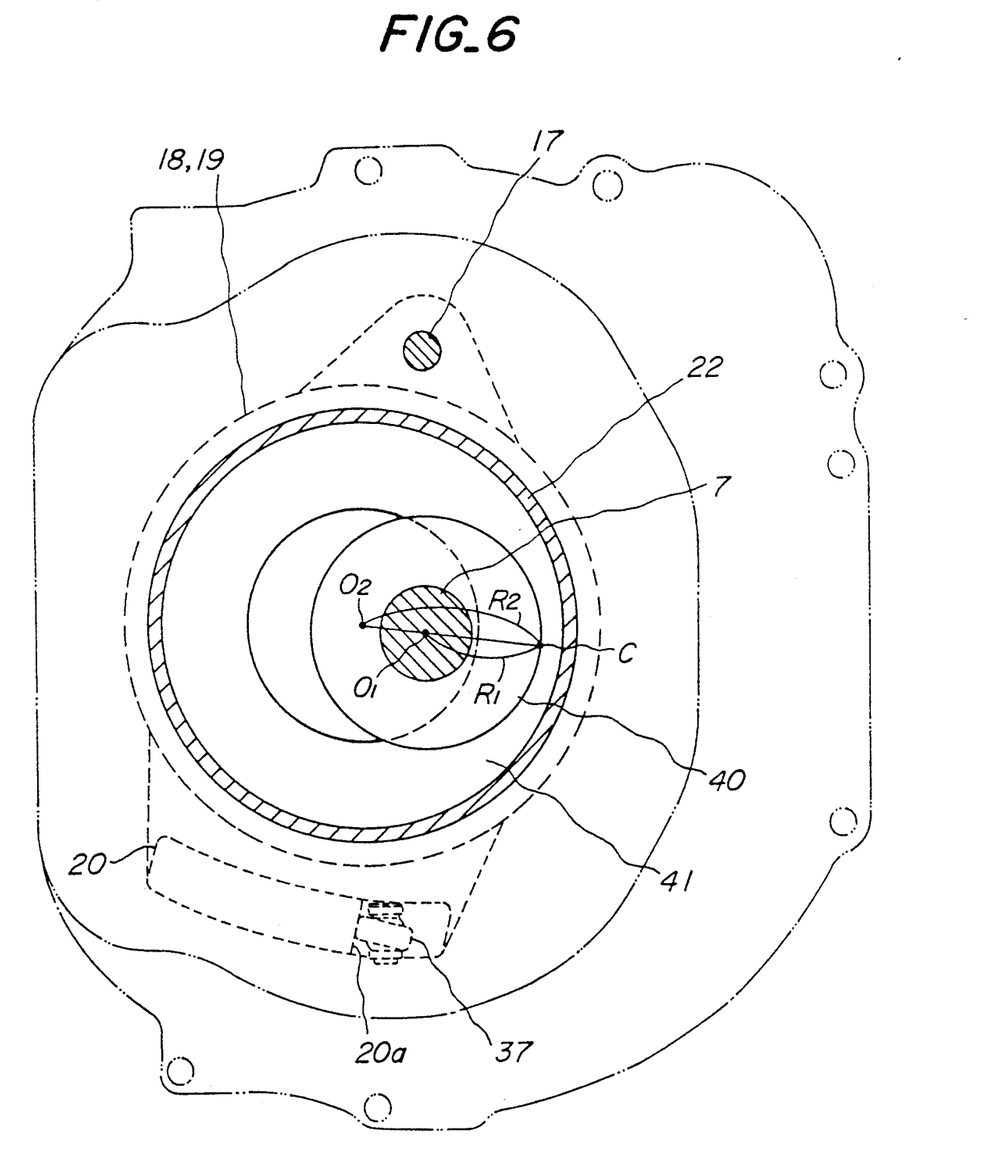
FIG. 6 is a sectional view illustrating the wedge-engagement of the friction discs in a section perpendicular to the input shaft.

FIG. 6 illustrates in phantom lines shapes of the rocking arms 18 and 19 in plan view. The shapes of the arms are of circular plates having protrusions on both sides. The upper protrusions are journaled by the countershaft 17, while free ends of the lower protrusions are connected by the connecting plate 20. The input shaft 7 is positioned in a space formed by the circular plates.

A driven rotary assembly 22 comprises a hollow cylindrical member 23, an annular bearing shell 24 joined to one end of the hollow cylindrical member 23 by means of bolts 25, and a stepped cylindrical bearing shell 26 fixed to the other end of the hollow cylindrical member 23 by means of welding.

The driven rotary assembly 22 is arranged to enclose the input shaft 7 in the main casing 1. The bearing shell 24 is journaled in a ball bearing 28 provided in the rocking arm 18, while the bearing shell 26 is journaled in a ball bearing 29 in the rocking arm 19 in a manner that when the rocking arms 18 and 19 are in positions shown in FIG. 1, an axis of the driven rotary assembly 22 is concentric to an axis of the input shaft 7.

In order to provide positioning means for the rocking arms 18 and 19, the main casing 1 is formed at a bottom surfaces with a bearing seat 1c (FIG. 4) to which is fixed a bearing holder 30 by means of bolts 31, and an operating shaft 32 is rotatably journaled in ball bearings 33 and 34 in the bearing holder 30.

An operating arm 35 is fixed with its bottom to the operating shaft 32 and formed at free end with a yoke in which a roller 37 is journaled by a pin 38 fixed to the yoke by means of a snap ring 39. The roller 37 is in contact with an abutment plate 20a fixed to a recess formed in the connecting plate 20.

Figure 1:
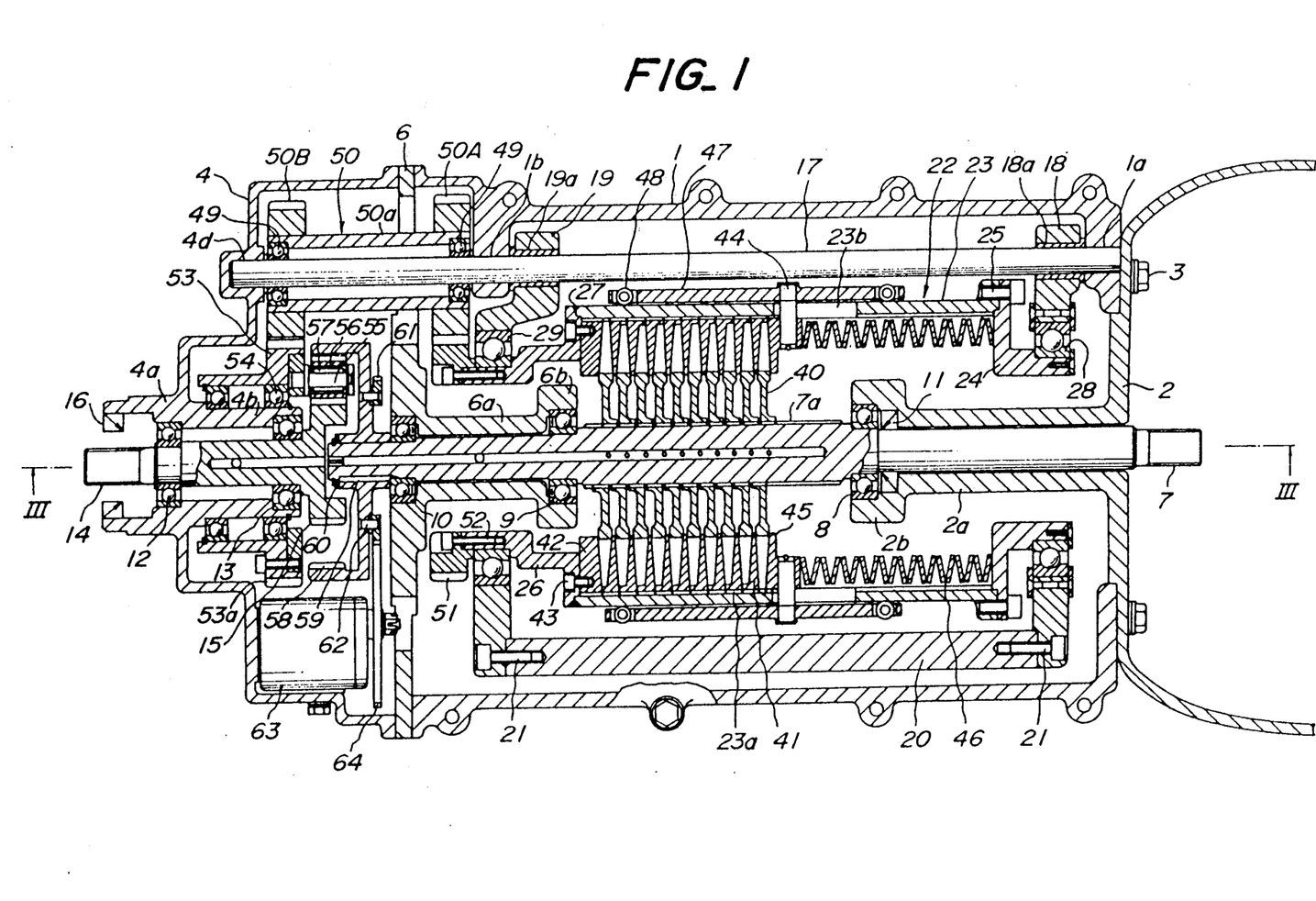
FIG. 1 is a longitudinal sectional view illustrating a d according to the invention.
Figure 2:
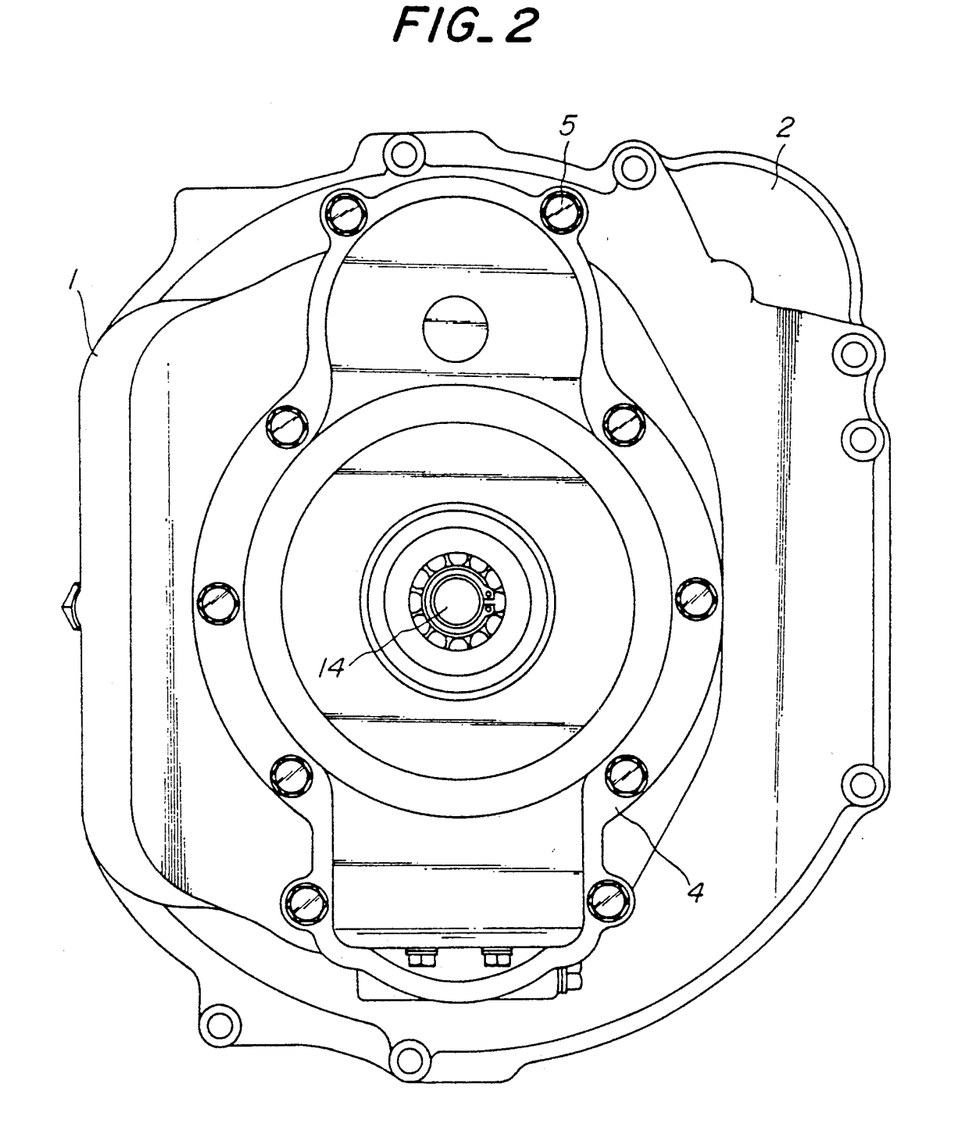
FIG. 2 is a rear view of the device shown in FIG. 1 viewed from the output side.
Figure 5:
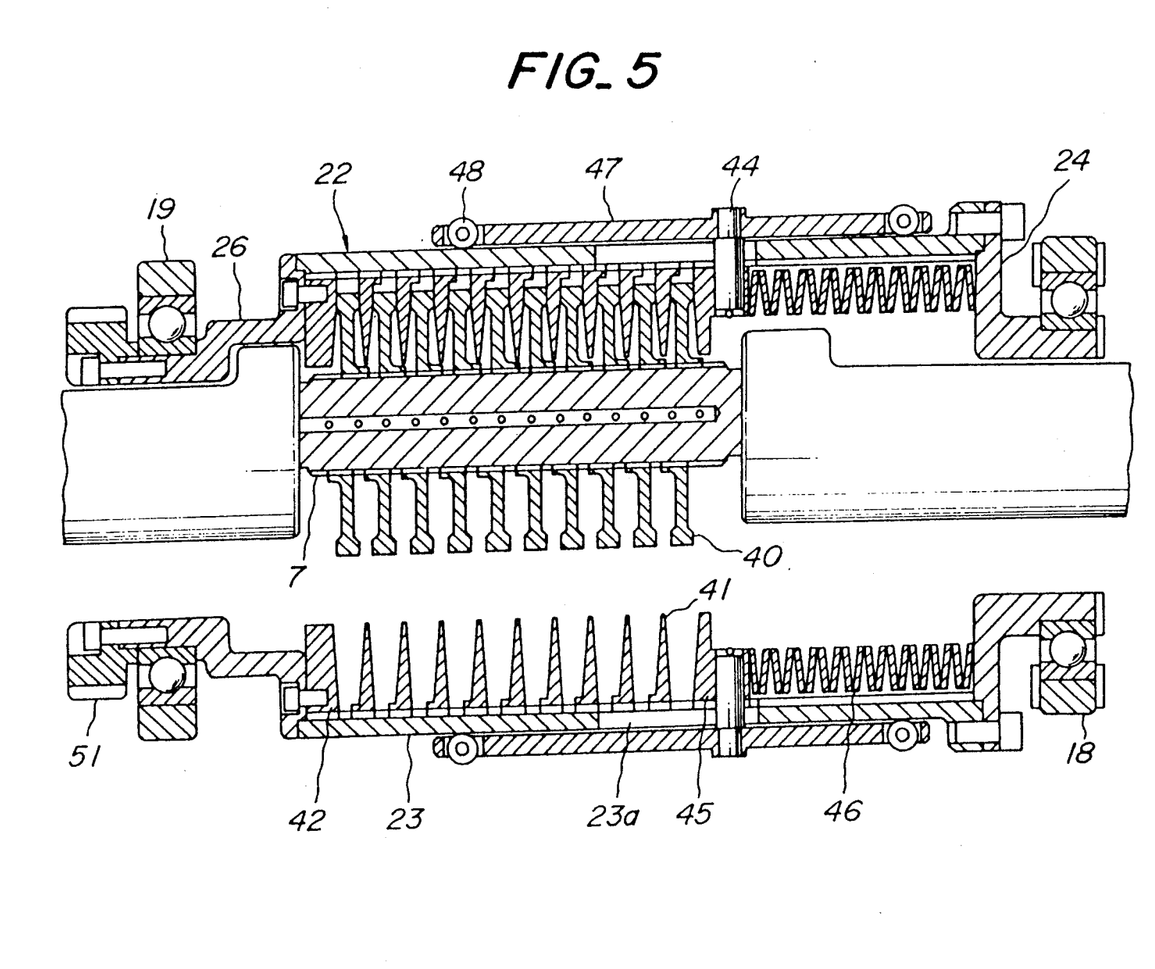
FIG. 5 is a sectional view illustrating the wedge-engagement of the respective friction discs when being eccentric.

Consequently, when the operating shaft 32 is operated to rotate the operating arm 35 as shown by arrows A and B (FIG. 3), the driven rotary assembly 22 is driven through the connecting plate 20 and the rocking arms 18 and 19 from the concentric position shown in FIG. 1 to the maximum eccentric position shown in FIGS. 5 and 6.

The input shaft 7 is formed at a center portion with spline grooves 7a, on which a number (ten in this embodiment) of circular ring-shaped driving friction discs 40 are fitted by means of the spline grooves 7a.

Moreover, the hollow cylindrical member 23 of the driven rotary assembly 22 is also formed in an inner circumference with spline grooves 23a, on which a number (nine in this embodiment) of circular ring-shaped driven friction discs 41 are fitted by means of the spline grooves 23a. Each of the driven friction discs 41 has a wedge-shaped longitudinal section which is thicker at an outer circumference and thinner at an inner circumference as shown in FIG. 1.

On an output side of the set of driven friction discs 41 there is provided a stationary friction disc 42 having an oblique surface inclined symmetrically to an opposed surface of the adjacent driven friction disc 41. The stationary friction disc 42 is fixed to a wall surface of the bearing shell 26 perpendicular to the input shaft 7 by means of bolts 43.

On the other hand, on an input side of the set of driven friction discs 41 there is provided on urging friction disc 45 having an oblique surface inclined symmetrically to an opposed surface of the adjacent driven friction disc 41. The urging friction disc 45 has on the input side connecting pins 44 fitted therein which extend through the hollow cylindrical member 23. The urging friction disc 45 is slidably fitted in the hollow cylindrical member 23 by means of a spline connection. The hollow cylindrical member 23 is formed with elongated apertures 23b along its generators through which the connecting pins 44 extend. A number (twenty in this embodiment) of dish-shaped springs 46 are provided in series between the urging friction disc 45 and the bearing shell 24.

A slide cylinder 47 is provided slidably on the hollow cylindrical member 23 through rollers 48 which are provided at both ends of the slide cylinder 47 and equally spaced on the circumference at six positions.

Outer ends of the connecting pins 44 are firmly fitted in the slide cylinder 47.

Consequently, the urging friction disc 45 is slidably fitted in the inner circumference of the hollow cylindrical member 23 through connecting pins 44 firmly fixed to the slide cylinder 47 slidably fitted on the hollow cylindrical member 23 through the rollers 48 without wobbling. Therefore, there is no risk of the urging friction disc 45 to incline or deflect from a parallel position.

An intermediate gear 50 is arranged on two ball bearings 49 provided on the countershaft 17 on the output side and comprises a gear 50A on the input side and a gear 50B on the output side integrally connected by a sleeve 50a. A gear 51 is fixed to the bearing shell 26 by means of bolts 52 and adapted to be in mesh with the gear 50A on the input side.

A gear 53 is rotatably provided through two ball bearings 54 on the boss 4b of the output side casing 4 and adapted to be in mesh with the gear 50B on the output side.

The gear 53 has a plurality (three in the embodiment shown in FIG. 7) of shafts 55 extending from a side surface of the gear 53. Planet gears 56 are rotatably provided on the shaft 55 through needle bearings 57, respectively, to be in mesh with the sun gear 15.

An internal gear 58 is fixed onto the end of the input shaft 7 on the output side through a key 59 and a snap ring 60 for preventing dislodgment of the internal gear 58 so that the internal gear 58 is internally in mesh with the planet gears 56.

A ring gear 61 is fixed on a side surface of a disc portion of the internal gear 58 on the input side by means of rivets 62 and in mesh with a gear 64 on a shaft of an oil pump 63 for lubrication provided in the output side casing 4 so as to drive the oil pump 63.

The operation of the apparatus constructed as above described according to the invention will be explained hereinafter.

FIG. 1 illustrates the driven rotary assembly 22 whose axis is concentric to that of the input shaft 7. In this condition, the roller 37 abuts against the abutting plate 20a of the connecting plate 20 as shown in FIG. 3.

Figure 3:
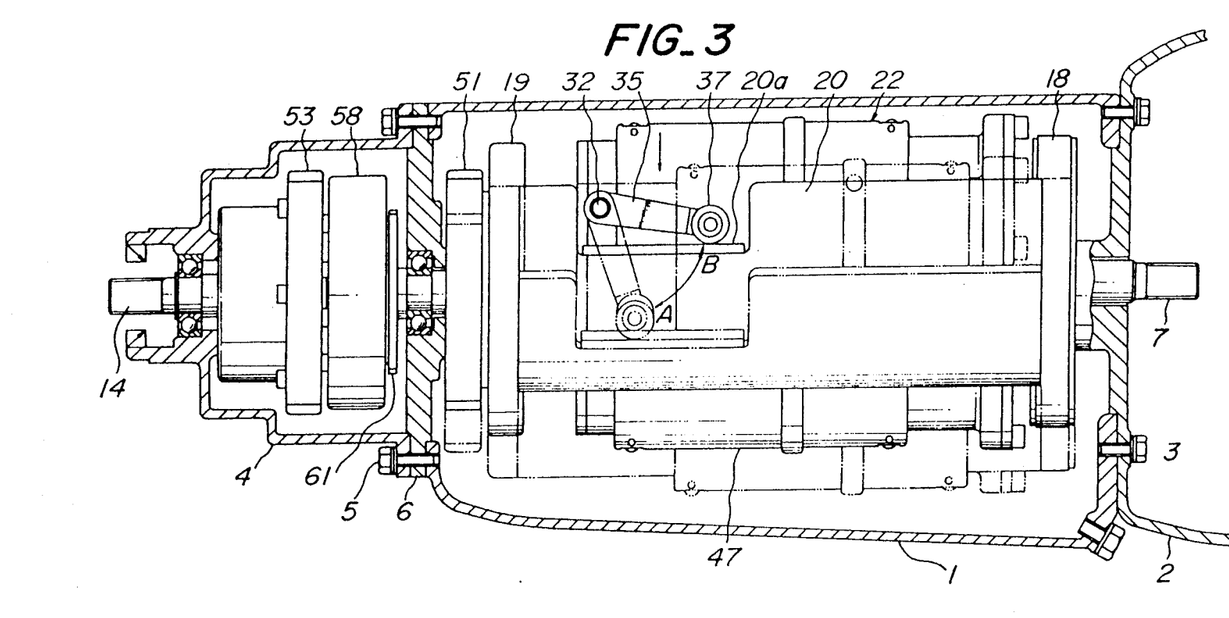
FIG. 3 is a sectional view taken along the line III—III in FIG. 1.
Figure 4:
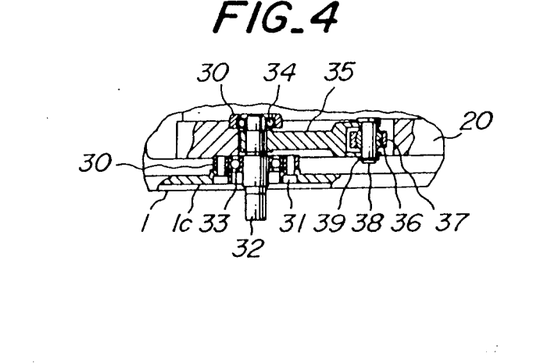
FIG. 4 is a partial sectional view of the eccentricity operating means used in the device shown in FIG. 1.

When the operating shaft 32 is rotated to rotate the roller 37 in the direction shown in the arrow A in FIG. 3, the connecting plate 20 is displaced into the position shown in the phantom lines. Consequently, the rocking arms 18 and 19 are rotated about the countershaft 17 so that the driven rotary assembly 22 is rotated about the countershaft 17 toward the left viewed in FIG. 6. As a result, the axis of the driven rotary assembly 22 becomes eccentric to the input shaft 7.

FIG. 5 illustrates such an eccentric condition in section. As shown in FIG. 5, and the sets of the driving and driven friction discs 40 and 41 are constantly subjected to forces driving these discs into the concentric positions because of the dish-shaped springs 46 pressing the set of the driven friction discs 41 and the inclined surfaces of the driven friction discs 41.

Therefore, when the operating shaft 32 is rotated in the reverse direction, the roller 37 is rotated in the direction of the arrow B from the position shown in the phantom lines to the original position with the aid of the forces driving the discs to the concentric positions.

In other words, by rotating the operating shaft 32, the driven rotary assembly 22 can be brought from the concentric position into any eccentric position relative to the input shaft 7 at will.

In the concentric position shown in FIG. 1, the sets of the driving and driven friction discs 40 and 41 are in contact with each other over whole circumferences and forced against each other by the dish-shaped springs 46. Consequently, the sets of the driving and driven friction discs 40 and 41 are rotated in unison without any slippage.

Therefore, under this condition, if the input shaft 7 is rotated, the driven rotary assembly 22 is also rotated so that the rotation is transmitted from the gear 51 integrally fixed to the driven rotary assembly 22 to the intermediate gear 50 on the countershaft 17. The rotation of the intermediate gear 50 is then transmitted to the gear 53a as the planet carrier 53.

Moreover, the internal gear 58 internally connected to the input shaft 7 is rotated together with the input shaft 7.

In other words, as the gear 53a as the planet carrier 53 and the internal gear 58 perform the same rotation, the respective planet gears 56 also perform a revolution in unison with these gears. As a result, the output shaft 14 integral with the sun gear 15 in mesh with the planet gears 56 performs the same rotation as that of the input shaft 7. This condition is so-called top speed condition in the stepless speed change device according to the invention.

When the operating shaft 32 under the top speed condition is rotated to the condition shown in FIGS. 5 and 6, the axis of the driven rotary assembly 22 is brought into the eccentric position relative to the input shaft 7.

In this case, contact portions of the driving and driven friction discs 40 and 41 are only in the proximity of C shown in FIG. 6. Under this condition, if the input shaft 7 is rotated, the driven rotary assembly 22 is also rotated. However, there is a difference between rotating radii of the sets of the driving and driven friction discs 40 and 41.

In more detail, referring to FIG. 6, $R_1 < R_2$, where a radius $R_1$ is a distance between the point C and a center $O_1$ of the set of the driving friction discs 40 and a radius $R_2$ is a distance between the point C and a center $O_2$ of the set of the driven friction discs 41. Therefore, the set of the driven friction discs 41 is rotated at a speed slower than that of the set of the driving friction discs 40.

In this embodiment, the speed reduction ratio is of the order of 1:0.65. In other words, the output shaft is rotated to lag by 0.35 rotation behind the rotation of the input shaft 7.

Moreover, when the driven rotary assembly 22 is rotated at a reduction speed, a rotation of the reduction speed is transmitted from the gear 51 integrally fixed to the driven rotary assembly 22 to the intermediate gear 50 on the countershaft 17. The rotation of the reduction speed is further transmitted from the intermediate gear 50 to the planet carrier 53 on the output shaft 14, with the result that the planet carrier 53 is rotated in a direction shown by an arrow D in FIG. 7.

Figure 7:
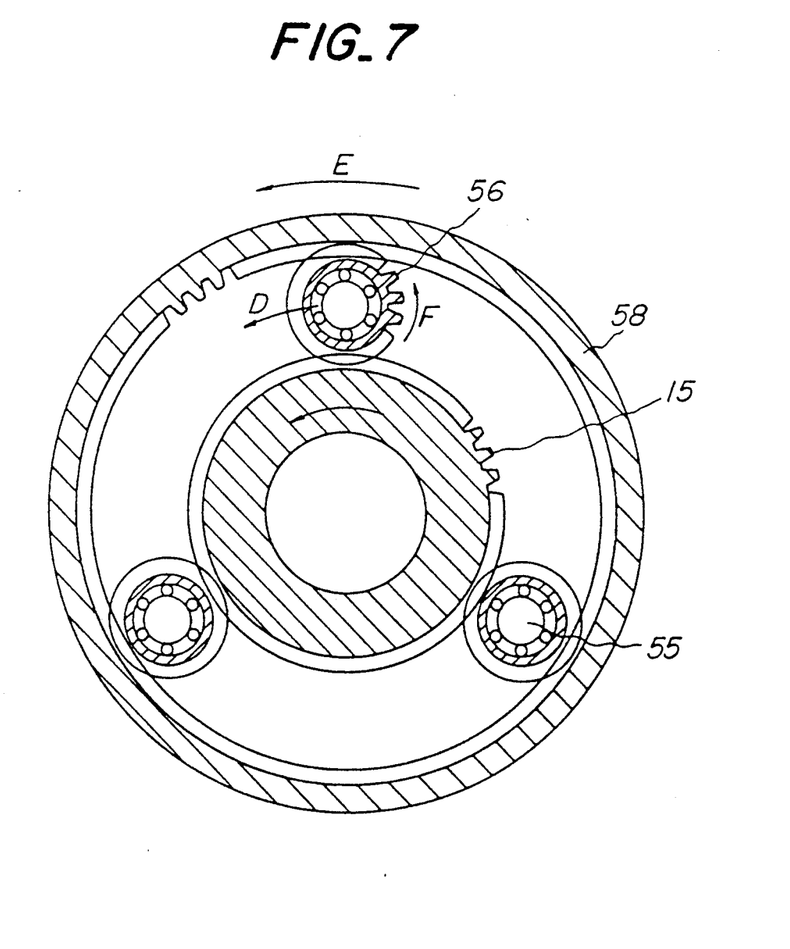
FIG. 7 is a sectional view of planetary gears used in the device according to the invention.

On the other hand, the internal gear 58 integrally connected to the input shaft 7 is rotated together with the input shaft 7 in a direction shown by an arrow E, while the planet carrier 53 is rotated at a speed slower than that of the internal gear 58. Therefore, the respective planet gears 56 are revolved in the direction of the arrow D about the sun gear 15 and rotated about the respective axes in directions shown by an arrow F, so that the sun gear 15 in mesh with the planet gears 56 is rotated at a slower speed than that of the planet gear 53. In other words, the planetary gear assembly serves to enhance the speed reduction of the driven rotary assembly 22.

An amplification factor in this embodiment is approximately 2.8. Therefore, the rotation of the output shaft 14 at a minimum speed (low) delays by 2.8 times difference in rotation $(1.0-0.65=0.35)$. As $0.35 \times 2.8 \simeq 1$ and at the same time one rotation in the reverse direction is effected, the rotation of the output shaft 14 is substantially zero. This condition is the so-called "low" speed changed condition of the stepless speed change device according to the invention.

When the operating shaft 32 is actuated to set the operating arm 35 at any position between the heads of the arrows A and B, any transmission ratio can be obtained between the top and low in a stepless manner.

If required, by enlarging the speed reduction ratio or amplification factor, the output shaft 14 can be rotated in reverse direction relative to the input shaft 7.

As can be seen from the above explanation, the discs are used for the friction transmission in the apparatus according to the invention. In other words, the set of the driving friction discs 40 rotating together with the input shaft 7 and the set of the driven friction discs 41 adjustable in eccentricity relative to the input shaft 7 are brought into internal contact with each other by wedge-engagement.

Moreover, in the top speed changed condition the driving and driven friction discs 40 and 41 are in engagement with each other in the concentric position. Consequently, both the friction discs are engaged with each other under pressure with all the circumferences. It is, therefore, possible to accomplish very high transmission efficiency such as approximately 100% without any slippage.

In speed conditions other than the top, the set of the driven friction discs 41 is concentric to the set of the driving friction discs 40 so that these friction discs are partially in contact with each other. The contact in this case is the internal contact and the difference in pitch line diameter at the friction transmission point C (FIG. 6) of both the friction discs is not very large. Accordingly, the contact lines of the friction transmission extend as thin lines on the pitch lines. Positive and negative slip zones on both sides of the pitch lines are narrower than those of the prior art. According to the invention, therefore, fairly high transmission efficiency can also be accomplished at speeds other than the top.

In other words, the friction stepless speed change device according to the invention exhibits in all speed zones the high transmission efficiency which is not expected with the prior art devices. The device according to the invention is very high in utility value particularly under a condition which transitionally requires stepless speed change and 1:1 transmission ratio is normally used.

According to the invention, the countershaft 17 in addition to the input shaft 7 and the eccentricity between both the friction discs is adjusted by rotating amounts of arms 18 and 19 rockable about the countershaft 17. With this arrangement, the driven rotary assembly 22 is supported at both ends so that the axes of the input and output shafts and the axis of the driven rotary assembly 22 are easily maintained in parallel with each other.

The driven friction discs 41 are constantly subjected to forces to open the discs out of the parallel position. However, as the urging friction disc 45 is firmly fixed to the slide cylindrical member 47 by means of the connecting pins 44, the urging friction disc 45 is prevented from inclining so that the driven friction discs 41 are maintained in parallel positions as a whole.

Therefore, the device according to the invention can exhibit the high transmission efficiency, while the respective discs are maintained in parallel positions even if a number of friction discs are used in multi-layers for transmitting large torque.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A friction stepless speed change device comprising an input shaft an output shaft rotatably arranged on a common axis, a countershaft provided in parallel with the input and output shafts on one side thereof, two rocking arms rockable about the countershaft, a cylindrical driven rotary assembly rotatably supported on free ends of the rocking arms and arranged to enclose the input shaft, a set of driving friction discs rotating together with the input shaft, a set of driven friction discs rotating together with the driven rotary assembly, said driving and driven friction discs being wedge-engaged with each other, an intermediate gear assembly having an input side gear and an output side gear integrally connected to each other, a gear fixed to the driven rotary assembly and being in mesh with the input side gear of the intermediate gear assembly, a gear arranged on a planet carrier rotatably provided on an extension of the common axis and being in mesh with the output side gear of the intermediate gear assembly, an internal gear integrally fixed to the input shaft, planet gears journaled on the planet carrier and being in mesh with the internal gear, and a sun gear integrally formed on the output shaft and being in mesh with the planet gears.

* * * * *